US012335230B1

(12) United States Patent
Tibrewal et al.

(10) Patent No.: US 12,335,230 B1
(45) Date of Patent: Jun. 17, 2025

(54) SELF-SERVICE MANAGEMENT OF NETWORK ADDRESS ALLOCATIONS USING HIERARCHICAL ALLOCATION POOLS

(71) Applicant: Amazon Technologies, Inc., Seattle, WA (US)

(72) Inventors: Raunak Tibrewal, Cupertino, CA (US); Jonathan Paul Kramer, Arlington, VA (US); Joseph Anthony Raccio, Arlington, VA (US); Eric Andrew Rubin-Smith, Fairfax, VA (US); Shovan Kumar Das, Medina, WA (US); Daniel Lawrence Iannuzzi, Vienna, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 37 days.

(21) Appl. No.: 18/508,907

(22) Filed: Nov. 14, 2023

(51) Int. Cl.
*H04L 61/5061* (2022.01)
*H04L 61/5007* (2022.01)

(52) U.S. Cl.
CPC ...... *H04L 61/5061* (2022.05); *H04L 61/5007* (2022.05)

(58) Field of Classification Search
CPC ............. H04L 61/5061; H04L 61/5007; H04L 41/0895; H04L 41/0893
USPC ........................................................ 709/245
See application file for complete search history.

(56) References Cited

U.S. PATENT DOCUMENTS

| | | | | |
|---|---|---|---|---|
| 7,924,789 B1* | 4/2011 | Breau | ............... | H04W 8/26 709/227 |
| 9,813,374 B1* | 11/2017 | Magerramov | ...... | H04L 61/5007 |
| 2003/0154307 A1* | 8/2003 | Puthiyandyil | ........... | H04L 61/35 709/245 |
| 2012/0198096 A1* | 8/2012 | Leng | ............... | H04L 61/5007 709/245 |
| 2013/0103836 A1* | 4/2013 | Baniqued | ............ | H04L 61/5014 709/226 |
| 2017/0353351 A1* | 12/2017 | Cheng | ............... | H04L 12/4625 |
| 2019/0238508 A1* | 8/2019 | Hira | ............... | H04L 63/20 |
| 2020/0021556 A1* | 1/2020 | Goelitz | ............... | G06F 9/5016 |
| 2020/0314004 A1* | 10/2020 | Rashad | ............... | H04L 43/10 |
| 2022/0368631 A1* | 11/2022 | Narula | ............... | H04L 45/02 |

FOREIGN PATENT DOCUMENTS

| | | | | |
|---|---|---|---|---|
| WO | WO-2019071464 A1 * | 4/2019 | ........... | G06F 16/901 |
| WO | WO-2020088343 A1 * | 5/2020 | ........ | H04L 12/2874 |
| WO | WO-2024003539 A1 * | 1/2024 | ............. | H04L 45/42 |
| WO | WO-2024037619 A1 * | 2/2024 | | |

* cited by examiner

*Primary Examiner* — Ruolei Zong
(74) *Attorney, Agent, or Firm* — Perilla Knox & Hildebrandt LLP; Thomas B. Hildebrandt

(57) ABSTRACT

Disclosed are various embodiments for self-service management of network address allocations using hierarchical allocation pools. A first network address pool is created for a customer of a cloud provider network. The first network address pool is divided into a second network address pool for a cloud resource of the customer. A first network address block from the second network address pool is assigned to the cloud resource.

20 Claims, 5 Drawing Sheets

SELF-SERVICE MANAGEMENT OF NETWORK ADDRESS ALLOCATIONS USING HIERARCHICAL ALLOCATION POOLS

BACKGROUND

Network addresses for the Internet are specified in respective addressing schemes for Internet Protocol version 4 (IPv4) and Internet Protocol version 6 (IPv6). IPv4 addresses are 32 bits in length and are usually visually represented by dotted quad notation, with four octets, each ranging from 0 to 255 and separated by periods. There are roughly 232 or 4,294,967,296 addresses, less reserved and/or system address ranges. The use of Classless Inter-Domain Routing (CIDR) allowed for allocation of addresses using variable length subnet masks and accompanying arbitrary length network prefixes. For example, a network "192.168.1.0/24" indicates a network prefix 24 bits in length using CIDR notation, with the equivalent subnet mask of "255.255.255.0" being implied by the "/24" CIDR notation. While four billion addresses may seem like a large number, every top-level block of IPV4 addresses has already been allocated. Because of IPV4 address exhaustion, the Internet is transitioning to the use of IPV6, which uses 128-bit addresses and 2128 possible addresses. IPv6 addresses are represented as eight groupings of four hexadecimal digits, each ranging from 0000 to ffff, and separated by colons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
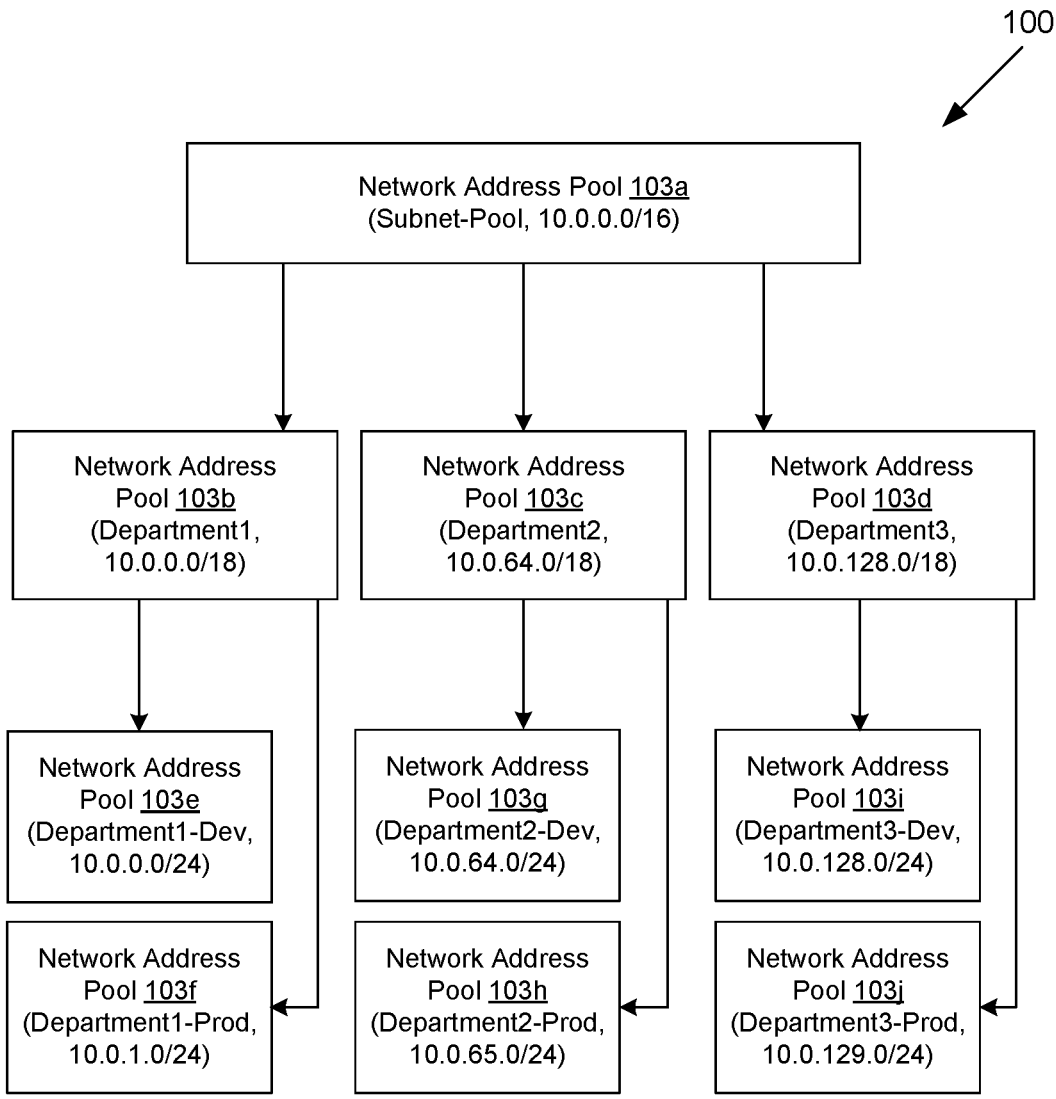
FIG. 1 is a drawing of one example of a hierarchy of network address pools according to various embodiments of the present disclosure.

The present disclosure relates to self-service management of network address allocations using hierarchical allocation pools. In various scenarios, such allocation pools may be employed to manage network address allocations to a virtual private cloud (VPC) network and various subnets of the VPC network. A VPC network is a custom-defined, virtual network within another network, such as a cloud provider network. According to the disclosed self-service network address allocation management, network administrators can automate VPC subnet IP address management workflows, allowing easier planning of VPC IP address space for subnet IP allocations that align with their organization's connectivity needs.

A VPC network may have one or more subnets, which correspond to logical divisions of the VPC network. In some examples, customers may group their computing resources into multiple subnets based upon respective use cases or other criteria. In other examples, customers may create separate VPC networks rather than use multiple subnets of a single VPC network. There may be limitations to the usage of a subnet based upon policies of the cloud provider network, such as to limit resources using a subnet to a particular region, availability zone, or data center of the cloud provider network. Individual subnets are allocated a contiguous block of network addresses (often referred to as a CIDR block), and hosts are assigned network addresses from this block manually or automatically via Dynamic Host Configuration Protocol (DHCP).

Organizations that manage networking infrastructure may need to keep track of network address allocations in order to know what address ranges are already allocated, or conversely, are unallocated and available for allocation. In various scenarios, a customer may be seeking a new network address allocation with at least a certain number of network addresses for a subnet of a VPC network, where the addresses are allocated from a pool of available addresses from the cloud provider or from a pool of addresses that the customer already controls. Using CIDR notation, the "/X" number of bits subtracted from the number of bits in the address yields the number of addresses available in a network according to the formula 2 (32-X) for IPV4 or 2 (128-X) for IPV6. For example, a request for a "/28" network allocation in IPv4 would be for 2 (32-28) or 16 contiguous addresses.

Customer resources or hosts on a cloud provider network are assigned network addresses (IPv4 and/or IPV6) in order to communicate with one another and with other resources or hosts on the cloud provider network. For example, when a customer creates a first VPC network, a first allocation of network addresses may be randomly allocated. When the customer subsequently creates a second VPC network, a second allocation of network addresses may be randomly allocated. These random allocations prevent customers from pre-planning their network address numbering. The first and second allocations may be non-contiguous, which may pose problems and interfere with unified management of hosts on the first and second allocations. For example, non-contiguous network address allocations would force customers to create individual static routes, security groups, access control lists, and firewalls for each function in their respective table.

It is also important to avoid unnecessary fragmentation of larger network address blocks to preserve them for customers who may require such larger allocations. To illustrate, within a "/30" block of four contiguous addresses in IPV4 are two "/31" blocks of two contiguous addresses each. Allocating a single address from the first "/31" block and a single address from the second "/31" block would make it impossible to allocate an entire "/31" block of two addresses. Thus, an allocation management system should seek to allocate both single addresses (each considered "/32" blocks) within one "/31" block, thus preserving the entire remaining "/31" block for a possible future allocation request of two contiguous addresses.

Various embodiments of the present disclosure introduce approaches for self-service management of network address allocations using hierarchical allocation pools. When a customer receives a block of network addresses, functionality is provided to enable the customer to fully manage that address block, including, for example, splitting the block into multiple blocks, resizing an allocation, combining one block with another, and so forth. This enables customers to be in control of the network addresses assigned for their use on the cloud provider network. With sequential numbering, customers can easily summarize the network addresses of their VPCs by team, function, application, and so on.

In some embodiments, a hierarchy of multiple levels of network address pools may be created to allocate network address blocks to particular subnets of a VPC. For example, a top-level network address pool may delegate or assign various network address blocks to a network address pool associated with a VPC. The VPC network address pool can further delegate or assign network address blocks to a subnet network address pool, and so forth.

Address blocks may be allocated to respective VPC subnets to enable routing management based upon type of resource assigned to the respective VPC subnets. For example, a customer having a large VPC network may have many different lines of business. A particular line of business may want to restrict the network address ranges for their cloud computing resources to be some particular address block so that their resources may be more easily classified and managed. Subnets for such use cases can draw from the network addresses in the particular address block, and routing rules may be established specific to the use cases. Different lines of business or teams may have different requirements, so larger subnets with more network addresses may be allocated to some, while smaller subnets with fewer network addresses may be allocated to others. In some embodiments, one or more tags may be applied to network address pool for a VPC subnet so that only resources that have been associated with the tag(s) are permitted to obtain a network address for that VPC subnet.

In some embodiments, creation of a resource (such as a VPC or VPC subnet) may automatically result in creation of a corresponding network address subpool from a higher-level network address pool. For example, a network administrator may create a top-level network address pool along with rules that govern creation of subpools in response to resource creation or instantiation. When a developer later creates a resource, a corresponding network address pool may spring into existence according to the rules previously established by the network administrator.

As one skilled in the art will appreciate in light of this disclosure, certain embodiments may be capable of achieving certain advantages, including some or all of the following: (1) improving the functioning of computer networks by enabling management of network addresses assigned to subnets of VPC networks; (2) improving the functioning of computer networks by enabling assignments of network addresses to be based at least in part on tags to ensure that computing resources associated with a certain tag are on a designated subnet; (3) improving the functioning of computer networks by enabling customers of a cloud provider network to manage their own network address allocations in a self-service way to meet the needs of their organizations' computer systems; (4) improving the functioning of computer networks by facilitating monitoring of network address utilization and other metrics within and across VPC subnets; (5) improving the functioning of computer networks by facilitating network address pool creation automatically according to a rule set upon cloud resource creation; and so forth.

With reference to FIG. 1, shown is one example of a network address pool hierarchy 100 for a customer of a cloud provider network. The customer, such as an organization or enterprise, may create an initial network address pool 103a for a particular VPC network. In this example, the initial network address pool 103a is named "subnet-pool" and is provisioned with the network address block "10.0.0.0/16" in CIDR notation. While private IPv4 network address space is used in FIG. 1, other examples may utilize public IPv4 and/or IPv6 network address space.

From a division of the initial network address pool 103a, additional network address pools 103 may be created. In this example, three network address pools 103b, 103c, 103d are created. Network address pool 103b is created for "Department1" of the customer and provisioned with the network address block "10.0.0.0/18." Network address pool 103c is created for "Department2" of the customer and provisioned with the network address block "10.0.64.0/18." Network address pool 103d is created for "Department3" of the customer and provisioned with the network address block "10.0.128.0/18."

Further divisions of the network address pools 103b, 103c, and 103d may be created. For example, network address pool 103e ("Department1-Dev", "10.0.0.0/24") and network address pool 103f ("Department1-Prod", "10.0.1.0/24") may be created from the network address pool 103b for a development subnet and a production subnet of Department1, respectively. Network address pool 103g ("Department2-Dev", "10.0.64.0/24") and network address pool 103h ("Department2-Prod", "10.0.65.0/24") may be created from the network address pool 103c for a development subnet and a production subnet of Department2, respectively. Network address pool 103i ("Department3-Dev", "10.0.128.0/24") and network address pool 103j ("Department3-Prod", "10.0.129.0/24") may be created from the network address pool 103d for a development subnet and a production subnet of Department3, respectively.

In some embodiments, an allocation tag rule may be applied to a respective network address pool 103 to ensure that all network address allocation requests are for resources that are tagged with one or more specified tag values. For example, computing resources of Department1 may be tagged with "Department-Department1," and allocation requests for the Department1-Prod pool may be granted to resources with that tag, while allocation requests for the Department2-Prod pool may be denied to resources with that tag. In this way, the network address pools 103 are able to ensure that computing resources are appropriately segmented for management purposes within the VPC network subnets. In the following discussion, a general description of the system and its components is provided, followed by a discussion of the operation of the same.

Figure 2:
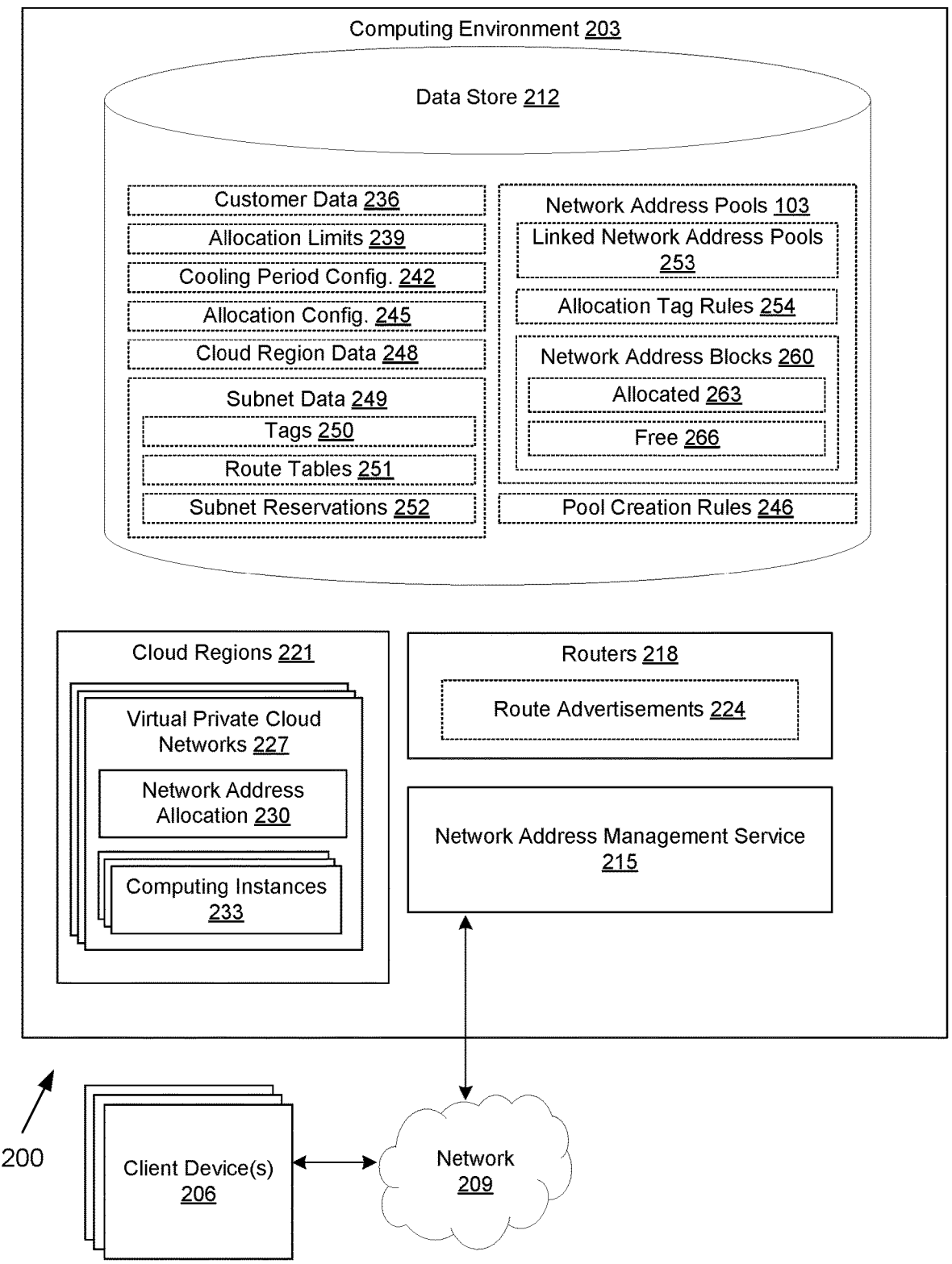
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209 The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

The computing environment 203 may implement a cloud provider network operated by a cloud provider. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

A cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

Transit Centers (TC) are the primary backbone locations linking customers to the cloud provider network and may be co-located at other network provider facilities (e.g., Internet service providers, telecommunications providers). Each region can operate two or more TCs for redundancy.

The parenting of a given edge location to an AZ or region of the cloud provider network can be based on a number of factors. One such parenting factor is data sovereignty. For example, to keep data originating from a communication network in one country within that country, the edge locations deployed within that communication network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a communication network has latency benefits, those benefits might be negated by parenting an edge location to a distant AZ or region that introduces significant latency for the edge location to region traffic. Accordingly, edge locations are often parented to nearby (in terms of network latency) AZs or regions.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components of the computing environment 203, for example, include a network address management service 215, one or more routers 218, one or more cloud regions 221, and other applications, services, processes, systems, engines, or functionality not discussed in detail herein. The network address management service 215 is executed to facilitate self-service management of network address allocations by customers on a cloud provider network. The network address management service 215 may provide user interfaces such as a command-line interface and/or a graphical user interface to receive commands and provide responsive information. The network address management service 215 may also provide application programming interfaces (APIs) to enable other components to interact with the network address management service 215 programmatically. As part of the management functionality, the network address management service 215 may enable creating network address pools for VPC networks and subnets, expanding network address pools, releasing network address pools, assigning allocation tag rules to network address pools, allocating blocks of network addresses from network address pools to VPC subnets or portions of VPC subnets, reallocating blocks of network addresses, releasing blocks of network addresses, combining blocks of network addresses, splitting blocks of network addresses, establishing rules for subpool creation in response to resource creation; and/or other management functions.

In various embodiments, the network address management service 215 may use structures such as prefix allocation trees and/or other functionality as described by U.S. Pat. No. 11,356,409, entitled "NETWORK ADDRESS ALLOCATION MANAGEMENT USING PREFIX ALLOCATION TREES," and issued on Jun. 7, 2022, U.S. Pat. No. 11,575,647, entitled "DISTRIBUTED NETWORK ADDRESS ALLOCATION MANAGEMENT," and issued on Feb. 7, 2023, U.S. Pat. No. 11,611,529, entitled "NETWORK ADDRESS ALLOCATION MANAGEMENT USING PREFIX ALLOCATION TREES WITH ASYNCHRONOUS WORKFLOWS," and issued on Mar. 21, 2023, which are incorporated herein by reference in their entireties. In various embodiments, the network address management service 215 may utilize cooling periods, allocation limits, internally reserved network address pools, and other functionality as described by U.S. patent application Ser. No. 18/475,882, entitled "SELF-SERVICE MANAGEMENT OF NETWORK ADDRESS ALLOCATIONS IN A CLOUD PROVIDER NETWORK," and filed on Sep. 27, 2023, which is incorporated herein in its entirety.

The routers 218 are employed to route data traffic between the network 209 and computing resources of the computing environment 203 and between different computing resources of the computing environment 203. The routers 218 may maintain a routing table including one or more route advertisements 224, which associate network addresses with destination or next-hop network interfaces, represented by media access control (MAC) addresses, for example. In some cases, the routers 218 may map overlay network addresses to substrate network addresses in the cloud provider network. The routers 218 may employ routing protocols such as border gateway protocol (BGP), open shortest path first (OSPF), and/or routing information protocol (RIP) to exchange routing information and receive the route advertisements 224.

The cloud provider network may be associated with a plurality of cloud regions 221. In one embodiment, a network address allocation may span only one cloud region 221 in order to simplify routing. In other embodiments, a network address allocation may span multiple regions 221.

Virtual private cloud (VPC) networks 227 of one or more customers may be in a cloud region 221. A VPC network 227 is a virtual network dedicated to a particular customer account (or set of related customer accounts, such as different customer accounts belonging to the same business organization). A VPC network 227 can provide the foundational network layer for a cloud service, for example a compute cloud or an edge cloud, or for a customer application or workload that runs on the cloud. A VPC network 227 can be defined by at least its address space, internal structure (e.g., the computing resources that comprise the VPC network), and transit paths. VPC network resources are typically hosted and provisioned within the cloud provider network, though customer-owned networks may be connected to the VPC network 227 through a gateway. In hosting the VPC network 227, the cloud provider network implements a logical construct using physical, and optionally virtual, resources of the cloud provider network to provision the VPC network 227.

A VPC network 227 is logically isolated from other virtual networks in the cloud. Customers can launch resources, such as compute instances, into a VPC network 227. When creating a VPC network 227, a customer can specify a range of IPV4 and/or IPv6 addresses for the VPC network 227 in the form of a Classless Inter-Domain Routing (CIDR) block. A VPC network 227 can span all of the availability zones in a particular region. After creating a VPC network 227, a customer can add one or more subnets in each availability zone or edge location. A subnet may be associated with its own routing table and/or routing rules to permit management of the subnet separately from other subnets of the same VPC network 227. A customer may also create one or more subnet reservations, which designate a portion of a subnet (e.g., a CIDR block within the subnet) as for the exclusive use of a set of a plurality of containers or an on-demand code execution service (e.g., for serverless compute using lambda functions, etc.), and so on.

A VPC network 227 may have one or more access controls. Access controls can refer to security groups or network access control lists. Security groups (also known as network security groups, application security groups, cloud security groups, or compute engine firewall rules, in various implementations) act as a virtual firewall for a virtual machine instance to control inbound and outbound traffic. Customers can define security groups as policies that can be applied to specific instances. When a customer launches an instance in a VPC network 227, they can assign one or more security groups to the instance. Security groups may act at the instance level instead of the subnet level. Therefore, each instance in a subnet can be assigned to a different set of security groups. For each security group, the customer can add rules that control the inbound traffic to instances, and a separate set of rules that control the outbound traffic. Security groups can be stateful, in that return traffic is automatically allowed.

A customer can also set up network access control lists (ACLs) with rules similar to security groups in order to add an additional layer of security to a VPC network 227. Network ACLs operate at the subnet level, support allow rules and deny rules, and automatically apply to all instances in any subnet with which it is associated. Network ACLs may not be stateful, in that return traffic must be explicitly allowed by the rules.

Each VPC network 227 may be associated with a network address allocation 230 and one or more computing instances 233. The network address allocation 230 corresponds to a block of network addresses that the customer has assigned to the particular VPC network 227. Different VPC networks 227 may be assigned different size network address allocations 230. Individual network addresses may be assigned to respective computing instances 233 of the customer, so that data traffic to the respective computing instance 233 can be correctly routed using the network address. Further, individual subnets or groups of subnets within a VPC network 227 may be associated with respective network address allocations 230.

The data stored in the data store 212 includes, for example, customer data 236, one or more allocation limits 239, a cooling period configuration 242, an allocation configuration 245, one or more pool creation rules 246, cloud region data 248, subnet data 249, one or more network address pools 103, and potentially other data.

The customer data 236 includes parameters associated with one or more accounts of a customer of the cloud provider. The parameters may include one or more characteristics that enable assessment of security risk, cloud resource demand, network address allocation demand, demand for VPC networks 227, and/or other information. These characteristics may facilitate determining a size of a network address pool 103 to be initially allocated, what changes are permissible to the network address pool 103, how many VPC networks 227 can be created, how long of a cooling period is used after a network address pool 103 is released, and so forth.

The allocation limits 239 may specify the maximum size network address pool 103 that can be assigned to a customer, or to customers meeting certain characteristics. In one scenario, a default allocation limit 239 may be used to limit the size of a network address pool 103 to a "/52" network. In another scenario, customers meeting certain criteria may be allowed to request a network address pool 103 of size "/48." The allocation limits 239 may also specify a maximum velocity of creating or modifying network address pools 103, and/or performing allocation operations with respect to the network address pools 103. The allocation limits 239 may also indicate limits with respect to creation of hierarchical network address pools 103 such as number of nested levels or other parameters.

The cooling period configuration 242 may control the establishment of a cooling period during which a released network address pool 103 is internally reserved for the customer and not available for assignment to another customer. The cooling period configuration 242 may specify a predefined default cooling period, or the cooling period configuration 242 may enable the dynamic determination of a cooling period length based upon one or more characteristics of the customer in the customer data 236. For example, customers who are more likely based on their past history to release and then re-request creation of network address pools 103 may be associated with a longer cooling period than customers who release network address pools 103 and then do not create new network address pools 103 for a time period.

The allocation configuration 245 may include one or more parameters that control the operation of the network address management service 215. For example, the allocation configuration 245 may define allocation strategies, such as using prefix allocation trees, in order to promote contiguity of network address allocations and avoid fragmentation of network address allocations.

The pool creation rules 246 may include rules that control creation of new network address pools 103, such as subpools, in response to events, such as creation or instantiation of resources on the cloud provider network. For example, a network administrator of a customer may configure a pool creation rule 246 that automatically creates a network address pool 103 with a "/18" network address block in response to a VPC network 227 being created. The network address pool 103 may be a subpool of a higher-level pool such as a "/16" network allocated to the customer. In various embodiments, the pool creation rules 246 may be manually curated by a network administrator, or may be automatically generated, e.g., based at least in part on machine learning trained on past behavior of a network administrator persona.

The cloud region data 248 may include data describing the plurality of cloud regions 221, including the VPC networks 227 assigned to the cloud region 221, network address allocations 230 assigned to the cloud region 221, and other data.

The subnet data 249 may include data regarding one or more subnets of a VPC network 227 for a customer. Such subnet data 249 may include, for example, one or more tags 250, one or more route tables 251, one or more subnet reservations 252, and/or other data. The tags 250 may include a name and value pair that indicates some information about computing resources on the subnet. For example, the tags 250 may indicate a type of computing resource, a department, a team, a type of protected information managed by a computing resource on the subnet, a security group, and/or other tags 250. The route tables 251 may include one or more routing rules specific to the subnet, such as routes to a default gateway, routes to other subnets, firewalling rules, and so on. The subnet reservations 252 may indicate an address block of the subnet that is reserved for a specific computing resource or set of computing resources. For example, a block of eight network addresses may be reserved for a set of containers, an on-demand code execution service, and so on.

The network address pools 103 are pools of network addresses that are issued by the cloud provider network from one or more root allocations to the cloud provider network. In one example, the network addresses correspond to publicly routable network addresses that are assigned to the cloud provider network. In another example, the network addresses correspond to internal network addresses that are routable only within the cloud provider network or a cloud region 221. In yet another example, the network addresses may correspond to publicly routable network addresses that are assigned to the customer. A network address pool 103 corresponds to a particular set of network addresses that are assigned to a particular customer for use by that customer in the cloud provider network or to connect hosts to the resources of the customer in the cloud provider network.

A network address pool 103 may include one or more linked network address pools 253, one or more allocation tag rules 254, and one or more network address blocks 260. The linked network address pools 253 correspond to network address pools 103 that are higher or lower in a hierarchy of network address pools 253. In one example, a linked network address pool 253 may be a parent network address pool 103 from which the network address pool 103 is created or divided. In another example, a linked network address pool 253 may correspond to a child network address pool 103 created or divided from the network address pool 253.

The allocation tag rules 254 may correspond to rules requiring that a requesting computing resource have a particular tag (or a combination of a particular tag name/value pair) in order to fulfill a request for network addresses and/or a network address block 260. For example, an allocation tag rule 254 may specify that network addresses in the network address pool 103 may be allocated only to resources within a given department. In some cases, the allocation tag rules 254 may pertain to a subset of network addresses within a network address block 260. For example, an allocation tag rule 254 may indicate that a particular network address be assigned only to a particular type of server, while other network addresses in the network address block 260 may be assigned to other server types.

The network address blocks 260 correspond to ranges of network addresses within the network address pool 103 that are either allocated 263 or are free 266 for future allocations by the customer. In one embodiment, a particular network address block 260 may be allocated to a VPC network 227, and then the network addresses of the network address block 260 may be assigned to individual hosts or computing instances 233 of the VPC network 227. Also, a particular network address block 260 may be allocated to a particular subnet of the VPC network 227, or to a particular subnet reservation 252 constituting a portion of a particular subnet of the VPC network 227.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

Figure 3:
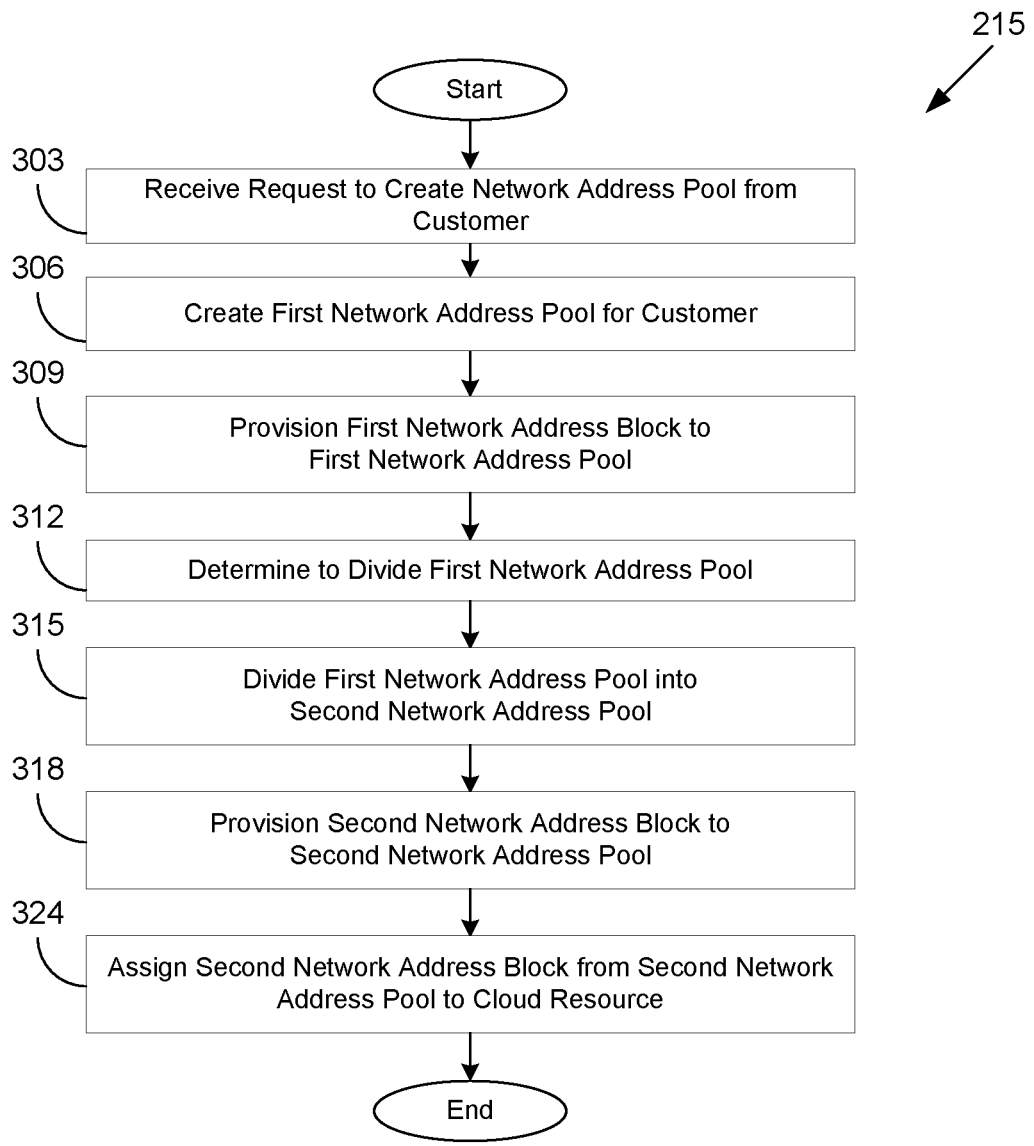
FIG. 3 is a flowchart illustrating one example of functionality implemented as portions of a network address management service executed in a computing environment in the networked environment of FIG. 2 according to various embodiments of the present disclosure.

Referring next to FIG. 3, shown is a flowchart that provides one example of the operation of a portion of the network address management service 215 according to various embodiments. It is understood that the flowchart of FIG. 3 provides merely an example of the many different types of functional arrangements that may be employed to implement the operation of the portion of the network address management service 215 as described herein. As an alternative, the flowchart of FIG. 3 may be viewed as depicting an example of elements of a method implemented in the computing environment 203 (FIG. 2) according to one or more embodiments.

Beginning with box 303, the network address management service 215 receives a request to create a network address pool 103 from a customer. For example, the request may be submitted by way of an API programmatically, or the request may be submitted by the customer through a user interface such as a command line interface or a graphical user interface using the client device 206. The request may specify a target cloud region 221 and/or the request may specify a desired size for the network address pool 103, for example, expressed in CIDR notation or network address prefix length.

In box 306, the network address management service 215 creates a first network address pool 103 for the customer. For example, the first network address pool 103 may be created for a VPC network 227 of the customer. In creating the first network address pool 103, the network address management service 215 may ensure that the request complies with the allocation limits 239 associated with the customer's characteristics or a default limit. For example, the network address management service 215 may determine a size of the first network address pool 103 based at least in part on one or more characteristics of the customer.

In box 309, the network address management service 215 provisions a first network address block 260 to the first network address pool 103 in response to a provisioning request from the customer. For example, the request may be submitted by way of an API programmatically, or the request may be submitted by the customer through a user interface such as a command line interface or a graphical user interface using the client device 206. The network address block 260 may comprise contiguous IPv4 addresses or IPv6 addresses registered to the customer or to the cloud provider network. In some cases, the network address block 260 may be specified by the customer directly, or the network address block 260 may be backfilled or obtained from an existing network address block 260 available to the first network address pool 103. The first network address block 260 may be assigned to the VPC network 227 of the customer for use by one or more subnets of the VPC network 227.

In box 312, the network address management service 215 determines to divide at least a portion of the first network address pool 103 into one or more child network address pools 103. In one example, the network address management service 215 may receive a request to create a subpool from the customer. In another example, the network address management service 215 by operation of the pool creation rules 246 may determine automatically to create a subpool in response to creation of a VPC network 227, a subnet, or another cloud resource.

In box 315, in response to determining to divide the first network address pool 103, the network address management service 215 proceeds to divide the first network address pool 103 into at least one second network address pool 103, thereby creating the second network address pool 103 as a subpool of the first network address pool 103. In some cases, the network address management service 215 may divide the first network address pool 103 into both a second network address pool 103 and a third network address pool 103 (e.g., for different subnets of a VPC network 227, for different VPC networks 227). The network address management service 215 may link the first network address pool 103 to the second network address pool 103 to form a hierarchy of network address pools 103. For example, the network address management service 215 may determine a size of the second network address pool 103 based at least in part on one or more characteristics of a first subnet.

In box 318, the network address management service 215 provisions a second network address block 260 to the second network address pool 103. The first network address block 260 may comprise both the second network address block 260 and a third network address block 260. The first network address block 260 may be of a different size compared to the second network address block 260. In provisioning the second network address block 260, the network address management service 215 may designate as allocated 263 the second network address block 260 within the first network address pool 103.

In box 324, the network address management service 215 assigns the second network address block 260, or a portion of the second network address block 260, from the second network address pool 103 to a cloud resource, such as a subnet of the VPC network 227 in response to a customer request or creation of the cloud resource. For example, the request may be submitted by way of an API programmatically, or the request may be submitted by the customer through a user interface such as a command line interface or a graphical user interface using the client device 206. In some examples, the request may specify a particular network prefix length for the allocation.

The step of dividing the first network address pool 103 may be performed multiple times for creating subpools for different cloud resources (e.g., different VPC networks 227, different subnets). Multiple subnets or VPC networks 227 may be created for different use cases of the customer and may have their own respective route tables 251. In some cases, the subnets and VPC networks 227 may be in different availability zones or edge locations. In some cases, a network address block 260 may be allocated to a portion of a subnet as a subnet reservation 252 for use by a set of containers, an on-demand code execution service, etc. Thereafter, the operation of the portion of the network address management service 215 ends.

The network address management service 215 may manage the allocations of the network address blocks in each of the network address pools 103 using a respective allocation trie. Subsequent to the allocation, network address utilization and other parameters may be monitored by or for the network address management service 215. Specific thresholds may be configured such that respective alerts may be generated for the subnets in response to network address utilization for the respective subnet meeting a corresponding threshold. The thresholds may be configured for each subnet and may differ among subnets. Metrics may be tracked and aggregated to different levels of a hierarchy of network address pools 103.

Figure 4:
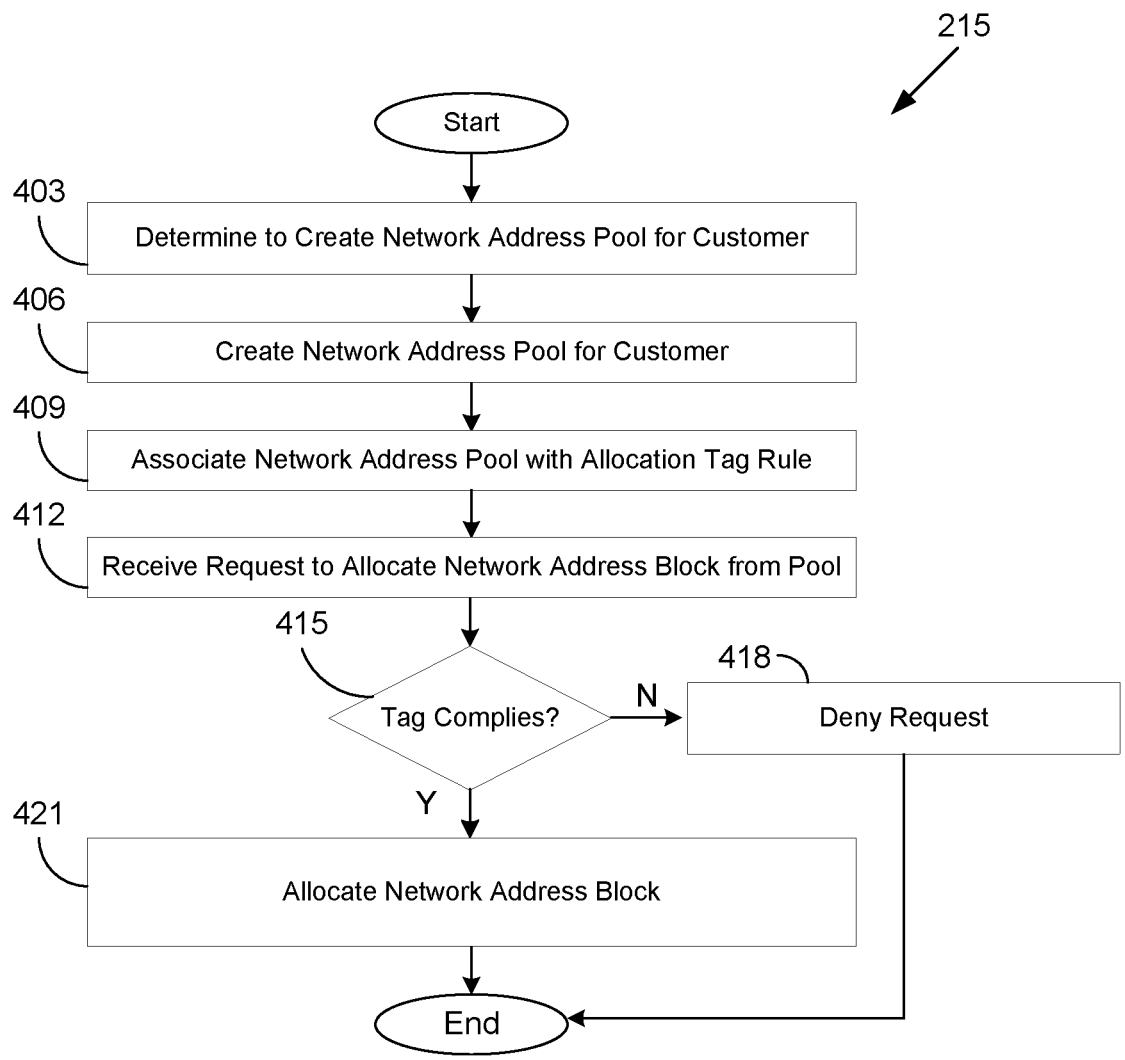
FIG. 4 is a flowchart illustrating one example of functionality implemented as portions of a network address management service executed in a computing environment in the networked environment of FIG. 2 according to various embodiments of the present disclosure.

Referring next to FIG. 4, shown is a flowchart that provides one example of the operation of another portion of the network address management service 215 according to various embodiments. It is understood that the flowchart of FIG. 4 provides merely an example of the many different types of functional arrangements that may be employed to implement the operation of the portion of the network address management service 215 as described herein. As an alternative, the flowchart of FIG. 4 may be viewed as depicting an example of elements of a method implemented in the computing environment 203 (FIG. 2) according to one or more embodiments.

Beginning with box 403, the network address management service 215 determines to create a network address pool 103 for a customer. For example, the network address management service 215 may receive a request to create a network address pool 103 for a VPC network 227 from a customer. For example, the request may be submitted by way of an API programmatically, or the request may be submitted by the customer through a user interface such as a command line interface or a graphical user interface using the client device 206. The request may specify a target cloud region 221 and/or the request may specify a desired size for the network address pool 103, for example, expressed in CIDR notation or network address prefix length. The request may specify one or more allocation tag rules 254 to determine computing resources that are permitted or not permitted to request network addresses from the network address pool 103. Alternatively, the network address management service 215 may determine automatically to create the network address pool 103 based at least in part on the pool creation rules 246 in response to creation of a cloud resource, such as a VPC network 227 or subnet.

In box 406, the network address management service 215 creates a network address pool 103 for the customer. In creating the network address pool 103, the network address management service 215 may ensure that the request complies with the allocation limits 239 associated with the customer's characteristics or a default limit. The network address management service 215 may automatically provision a network address block 260 to the network address pool 103 for allocation. In box 409, the network address management service 215 associates the allocation tag rules 254 specified in the request with the network address pool 103 to configure the network address pool 103 to enforce the allocation tag rules 254.

In box 412, the network address management service 215 receives a request for a computing resource to allocate a network address block 260 of one or more network addresses from the network address pool 103. The request may present one or more tags 250 associated with the computing resource. In box 415, the network address management service 215 determines whether the tags 250 comply with the allocation tag rules 254 associated with the network address pool 103. If the tags 250 do not comply with the allocation tag rules 254, the network address management service 215 moves from box 415 to box 418 and denies the request for the network addresses. Thereafter, the operation of the portion of the network address management service 215 ends.

If, instead, the network address management service 215 determines that the tags 250 comply with the allocation tag rules 254, the network address management service 215 proceeds from box 415 to box 421 and allocates the requested network address block 260 (e.g., to a subnet of the VPC network 227) for use by the computing resource. The network address management service 215 may designate the network address block 260 as allocated 263 instead of free 266. Thereafter, the operation of the portion of the network address management service 215 ends. In some embodiments, rather than allowing or disallowing allocations, the network address management service 215 may assign a compliance status to the respective network address block 260 or network address pool 103, where a status of compliance is assigned if the subnet allocation is in accordance with allocation tag rules 254, and a status of non-compliance is assigned if the subnet allocation is not in accordance with allocation tag rules 254.

Figure 5:
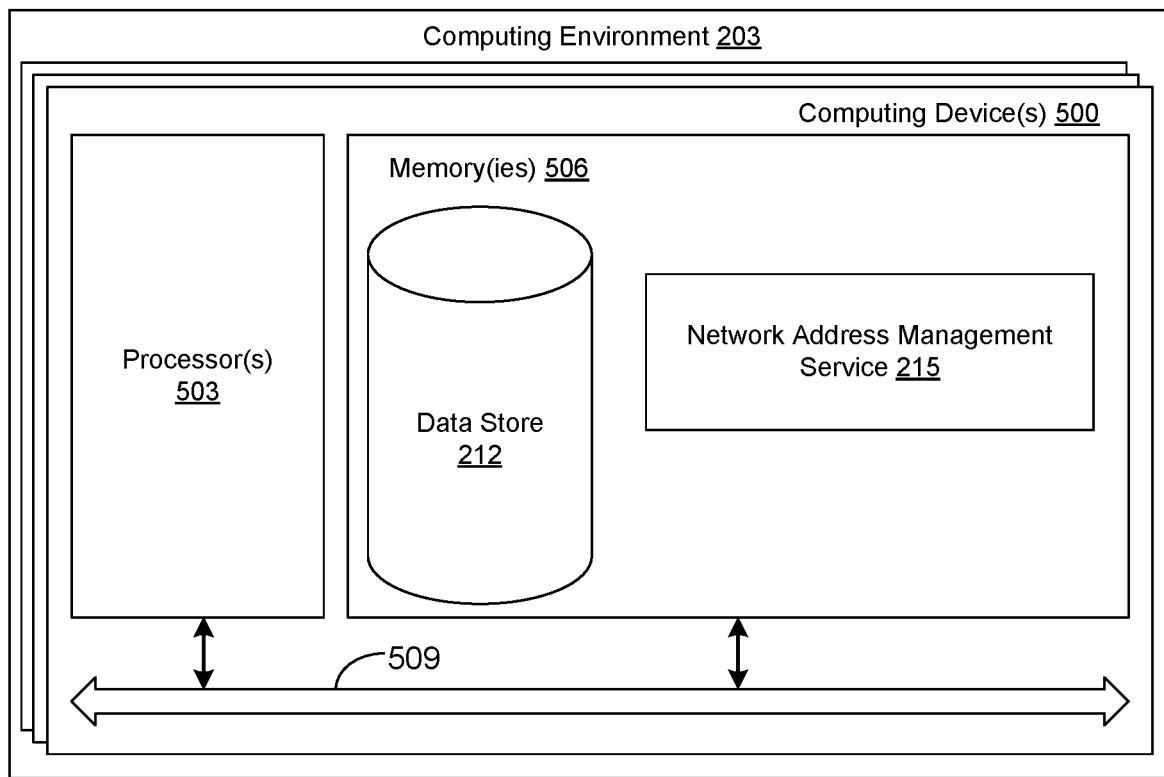
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network address management service 215, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although network address management service 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the network address management service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network address management service 215, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network address management service 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a cloud provider network comprising a plurality of regions; and
   at least one computing device implementing a self-service network address allocation service configured to at least:
   create a first network address pool for a virtual private cloud (VPC) network of a customer of the cloud provider network;
   provision a first network address block to the first network address pool, the first network address block comprising a second network address block and a third network address block;
   divide the first network address pool into a second network address pool and a third network address pool;
   assign the second network address block from the second network address pool to a first subnet of the VPC network; and
   assign the third network address block from the third network address pool to a second subnet of the VPC network.

2. The system of claim 1, wherein the first network address block comprises contiguous internet protocol version 6 (IPv6) addresses or internet protocol version 4 (IPv4) addresses registered to the cloud provider network.

3. The system of claim 1, wherein the self-service network address allocation service is further configured to at least:
   assign an allocation tag rule to at least one of: the second network address pool or the third network address pool; and
   evaluate a network address allocation request associated with a tag for compliance with the allocation tag rule before fulfilling the network address allocation request.

4. The system of claim 1, wherein the self-service network address allocation service is further configured to at least determine a size of the first network address block based at least in part on one or more characteristics of the customer.

5. The system of claim 1, wherein the self-service network address allocation service is further configured to at least determine a size of the second network address block based at least in part on one or more characteristics associated with the first subnet.

6. The system of claim 1, wherein the self-service network address allocation service is further configured to at least:
receive an allocation request for the first subnet specifying a particular network prefix length; and
wherein the second network address block is allocated to the first subnet based at least in part on the particular network prefix length.

7. A computer-implemented method, comprising:
creating a first network address pool for a customer of a cloud provider network;
dividing the first network address pool into a second network address pool for a cloud resource of the customer in the cloud provider network; and
assigning a first network address block from the second network address pool to the cloud resource of the customer in the cloud provider network.

8. The computer-implemented method of claim 7, wherein the cloud resource comprises a virtual private cloud (VPC) network of the customer.

9. The computer-implemented method of claim 7, wherein the first network address pool is created for a virtual private cloud (VPC) network of the customer, and the cloud resource comprises a subnet of the VPC network.

10. The computer-implemented method of claim 7, further comprising assigning a third network address block from the second network address pool for use by at least one of: a plurality of containers or an on-demand code execution service.

11. The computer-implemented method of claim 7, further comprising assigning a third network address block from the first network address pool to the cloud resource, the third network address block comprising the first network address block and a second network address block.

12. The computer-implemented method of claim 7, further comprising determining to divide the first network address pool into the second network address pool based at least in part on a pool creation rule and in response to a creation of the cloud resource.

13. The computer-implemented method of claim 7, further comprising:
associating the first network address block with an allocation tag rule;
receiving a request for a network address from the first network address block for a computing resource; and
fulfilling the request for the network address in response to determining that a tag associated with the computing resource complies with the allocation tag rule.

14. The computer-implemented method of claim 7, further comprising:
monitoring network address utilization of the first network address block; and
generating a alert in response to the network address utilization of the first network address block meeting a first threshold.

15. The computer-implemented method of claim 7, further comprising managing allocations of network address blocks in the first network address pool and the second network address pool using a respective allocation trie.

16. A computer-implemented method, comprising:
creating a network address pool for a customer of a cloud provider network;
associating the network address pool with an allocation tag rule;
receiving a first request to allocate a first network address block from the network address pool, the first request indicating a first tag associated with a computing resource;
determining that the first tag complies with the allocation tag rule; and
allocating the first network address block from the network address pool in response to determining that the first tag complies with the allocation tag rule.

17. The computer-implemented method of claim 16, wherein the network address pool is created in response to a pool creation request from the customer.

18. The computer-implemented method of claim 16, wherein the network address pool is created automatically in response to a creation of a virtual private cloud (VPC) network or a subnet of the VPC network for the customer.

19. The computer-implemented method of claim 16, further comprising provisioning a specified network address block to the network address pool, the specified network address block comprising the first network address block.

20. The computer-implemented method of claim 16, further comprising:
receiving a second request to allocate a second network address block from the network address pool, the second request indicating a second tag associated with a different computing resource;
determining that the second tag does not comply with the allocation tag rule; and
denying the second request in response to determining that the second tag does not comply with the allocation tag rule.

* * * * *